G. BISCHOF, Jr.
Preparing Finely Divided Iron, &c.
No. 74,791. Patented Feb. 25, 1868.
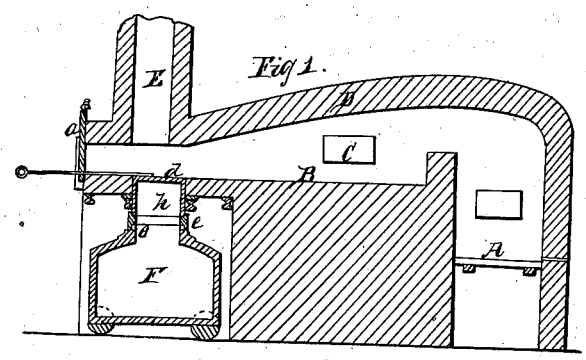
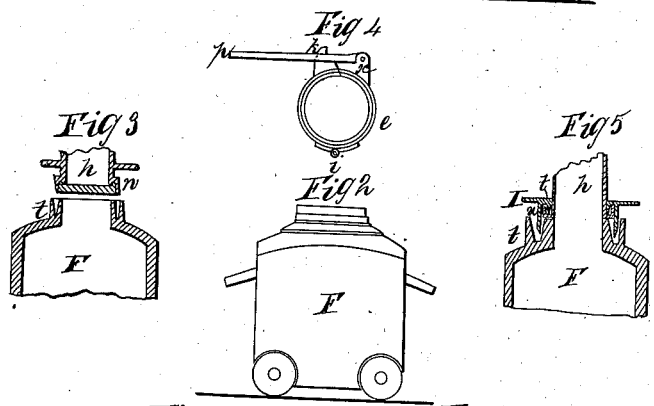
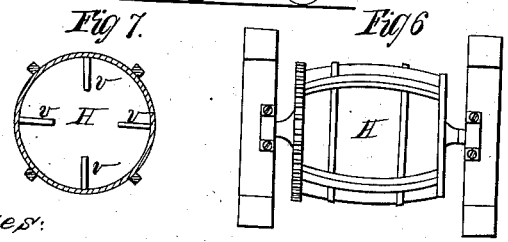

UNITED STATES PATENT OFFICE.

GUSTAV BISCHOF, JR., OF SWANSEA, GREAT BRITAIN, ASSIGNOR TO HIMSELF AND JOHN L. KIDWELL, OF GEORGETOWN, D. C.

IMPROVEMENT IN PREPARING FINELY-DIVIDED IRON, AND THE SEPARATION OF COPPER, SILVER, AND OTHER METALS FROM THEIR SOLUTIONS.

Specification forming part of Letters Patent No. 74,791, dated February 25, 1868.

*To all whom it may concern:*

Be it known that I, GUSTAV BISCHOF, Jr., of Swansea, county of Glamorgan and Kingdom of Great Britain, have invented a new and Improved Process for Preparing Metallic Iron, and in the Use of the Same for Treating Solutions containing Copper or Silver, and for other purposes; and I hereby declare that the following is a clear, full, and exact description thereof, reference being had to the accompanying drawings making part of this specification, in which—

Figure 1 is a longitudinal vertical section of the furnace and receiver. Figs. 2, 3, 4, and 5 represent modifications of the plan used for closing the connection of the receiver with the furnace, so as to exclude the air therefrom; and Figs. 6 and 7 represent the mixing-vessel which may be used in the process.

The nature of my invention consists, first, in an improved mode of preparing the metallic iron used in the process; second, in the process of separating copper and silver from their solutions; and third, the use of the metallic iron, thus prepared, for other purposes.

In preparing the metallic iron, I use any of the oxides of iron, natural or artificial, first reducing it to a fine powder, by stamping, grinding, or otherwise, and then add thereto pulverized coal, coke, charcoal, or other carbonaceous material, in the proportion of twenty per cent. of the latter to one hundred per cent. of the former, mixing the two intimately together, the proportions being varied to correspond with the varying qualities of the oxides, as occurs in practice. This mixture I then submit to a heat sufficient to reduce the oxide to a metallic state, but not high enough to fuse it, a bright red heat being about that required, and the reduction being accomplished usually in about five or six hours, when considerable masses of the material are operated upon.

As finely-divided iron thus produced is liable to become rapidly reoxidized, when exposed to the atmosphere in its heated state, it is necessary to remove it from the furnace to a vessel that can be closed as nearly air-tight as possible, until it has become cool, and also to exclude the air from it during its removal from the furnace to the receiving-vessel. To accomplish these objects I provide a furnace, as represented in Fig. 1, in which—

A represents the fire-chamber; B, the oven for roasting the material; and E, the chimney. For introducing the material to the oven, it may be provided with a door, C, at one side, or a movable section, D, at the top, as shown in the drawing. At the rear end of the furnace a small door, a, is located, to afford the means of raking or stirring the material during the process, this opening being located back of the chimney, so that any air which may enter there shall pass directly up the chimney, and thus be prevented from passing on into the body of the oven, and coming into contact with the heated material.

For the purpose of removing the heated material, without exposing it to contact with the air, I provide an opening in the bottom of the furnace or oven, near its rear end, having a removable cover, d, as shown in Fig. 1, there being also a chamber or recess formed underneath, for receiving the vessel F, so that the latter may be placed directly under this opening. A tube, h, is secured in the opening, and extends downward, so as to coincide with the mouth of the receiver F, the latter being made with a neck, o, corresponding in size externally with the lower end of the tube h, as shown in Fig. 1.

To make the connection between the tube h and the neck o air-tight, I provide a collar, e, as represented in Fig. 4. This collar is composed of two semicircular pieces, united by a hinge, i, at one side, and having on the opposite side a lug, x, attached to one piece, and a lug, k, attached to the other. To the lug x a lever, p, is pivoted, this lever having a slot formed in it, so that, when the collar is closed, the lever will shut over the projecting point of the lug k, and, by pressing against its inclined edge, thus draw and hold the two parts of the collar together. When the receiver F is placed in position under the tube h, this collar is opened and placed around the adjoining end of the tube h and the neck o of the receiver F, and closed thereon, as shown in section in Fig. 1, and being drawn tightly together on them, by means of the lever p, it serves to unite them, and thus form a passage through which the heated material can be raked from the furnace into the receiver F, without being brought in contact with the air.

Instead of the collar e other devices may be used for this purpose, as represented in Figs. 3 and 5.

In Fig. 3, the tube h is represented with a flange, n, arranged to enter a circular groove, l, formed in the top of the neck o of the receiver, the receiver, in this case being so arranged that, after it has been run under the tube h, it may be elevated, by screws or any other suitable means, so as to cause the flange n to enter the groove l, the latter being filled with finely-pulverized charcoal or other suitable material, to render the joint air-tight, or as nearly so as possible; or this may be accomplished in a still simpler manner, by means of the device represented in Fig. 5. In this case, the lower portion of the tube h is provided with a flange, turned up so as to form a groove or channel, as shown in Fig. 5; and a collar, I, is then placed around the tube h, this collar being provided with a short vertical flange, t, arranged to fit into the groove on the tube h, while a longer vertical flange, u, projects down and fits into the groove l in the top of the neck o of the receiver F, the grooves being filled with pulverized charcoal, or other material, as in the former case. When thus arranged, it is only necessary to slide the collar I up on the tube h to disengage it from the receiver, and permit the latter to be removed. When the material is thus removed from the oven to the receiver, the latter is covered closely, and kept closed until the material has become cool, when it is ready for use. If properly treated, it will now be in the condition of a loosely-coherent or spongy mass, and can be reduced, even by hand, to a fine powder, though I prefer using rollers for this purpose. It will then be in a suitable state for use in precipitating copper from its solution.

In this, the second part of my invention, I proceed as follows: To the solution I add iron-powder in large excess. The copper is then precipitated almost instantaneously, the chemical action being so strong that the fluid is considerably heated. After the whole of the copper in solution is precipitated, the fluid remaining, consisting chiefly or principally of a solution of an iron salt, is drawn or run off, and another solution of copper added. This is repeated until only a small portion of the iron-powder remains undissolved. When this stage of the process is reached, which is indicated by the slowness of the precipitation, I prefer to remove the last traces of the iron by adding the dilute wash-waters from the process of lixiviating the copper from ores; or if, on the other hand, there be, at this stage of the precipitation, a small excess of copper in solution, the same may be precipitated by adding a little very fine iron-powder, obtained by riddling through a fine sieve some of the powder which has been crushed by rollers or otherwise. During the process, it will be well to stir up the iron-powder with a wooden shovel or pole, or the stirring may be effected by a wooden rake, driven by steam or other power. In most cases, however, I find it advantageous to effect the precipitation without any raking, much in the manner in which certain ores are amalgamated by the so-called European method, namely, by suspending large round wooden casks, Figs. 6 and 7, horizontally in a frame-work, and having a bearing at each end, as shown. Such casks have, in their interior, partitions v, Fig. 7, extending from end to end, and about one foot wide. Liquor and iron-powders having been added, as before described, an intimate mixture of both is effected by turning the cask on its axles, either by hand or machinery. The best speed for such casks is to rotate once in from two to five minutes. If the casks were turned without partitions, the iron-powders would slide along their sides, that portion of the powder nearest the sides not coming in contact with the solution of copper. But these partitions carry the powder up in their rotation, and, when reaching a certain elevation, throw it down again through the liquor, thus turning it continually. The precipitation of copper having been finished, the liquor is run off through an opening, (not shown in the drawing,) and then another copperas solution added, and so on, as before described. The precipitated copper is finally raked out through some opening for the purpose. In this process, either sulphide or chloride of copper may be used to form the copperas solution.

Some substances, such as arsenic, are only precipitated from their solutions after metallic iron has been in contact therewith several hours. As the precipitation of copper from its solutions takes place, by the process described, almost instantaneously, and, under all circumstances, in a very short time, such substances as arsenic remain in solution, and are carried off with the so-called spent liquors, from which the copper has been precipitated, and the copper obtained is much purer than that resulting from treating copper solution by iron in other forms.

Many iron ores contain copper, and this is often particularly the case in the pyritous ores used in the manufacture of sulphur or sulphuric acid. In Missouri, Arkansas, and perhaps some other States, some of the richest specular oxides are so contaminated with copper as to seriously injure the malleable iron made from such ores.

The residuum from pyritous materials, above mentioned, and the copperas specular oxides, will be especially advantageous for obtaining the iron-powder by this process. When they contain three, four, or five per cent. of copper, this metal, which they contain in themselves, will often repay the cost of the ore and its reduction, and even return a profit, under favorable circumstances. The metallic copper obtained by this improved process is, of course, a finely-divided powder. When the object is only to obtain this metal in the workable condition, commonly used in the arts, it is only necessary to melt and refine this powder, and to run it into bars or ingots. But there are many cases in which the finely-divided copper can be used to better advantage than when in any other form, one of these applications being to precipitate silver from its solutions, as chloride or sulphate; for which purpose hitherto ready-manufactured copper, principally in the shape of ingots, has been used. The latter, besides precipitating slower than finely-divided precipitated copper, is much more expensive, especially in some localities.

In the manufacture of aniline, it is well known that large quantities of finely-divided iron are required. Heretofore this has consisted chiefly of filings, turnings, &c., and consequently this article, so important in the arts at the present time, can only be produced where these iron products can be produced to advantage and at a reasonable price. The finely-divided iron produced according to my process removes this difficulty by producing an article inexhaustible in its supply, entirely independent of other contemporaneous manufactures, and at a cost much less than those now used. My finely-divided metallic iron may also be applied to the manufacture of steel by process well known.

Having thus set forth fully the nature of my invention, what I claim as new, and desire to secure by Letters Patent, is—

1. The preparation of finely-divided metallic iron, in the manner and by the process substantially as described.

2. The combination and arrangement of the receiver F with the furnace, for deoxidizing the ores or oxides of iron, and securing the product from the oxidizing effects of the atmosphere, as set forth.

3. The precipitation of metallic copper from its solutions, by the use of finely-divided iron, prepared as described, and in the manner set forth.

4. The use of the finely-divided metallic iron, produced in the manner set forth, for the manufacture of steel, and for other manufacturing purposes.

5. The use of finely-divided metallic copper, produced in the manner set forth, for separating silver from its solutions.

GUSTAV BISCHOF, Jr.

Witnesses:
W. C. DODGE,
L. JONES.